US006243181B1

(12) United States Patent
Golovchenko et al.

(10) Patent No.: US 6,243,181 B1
(45) Date of Patent: Jun. 5, 2001

(54) REDUCTION OF COLLISION INDUCED TIMING JITTER BY PERIODIC DISPERSION MANAGEMENT IN SOLITON WDM TRANSMISSION

(75) Inventors: Ekaterina A. Golovchenko; Alexei N. Pilipetskii, both of Columbia; Curtis R. Menyuk, Silver Spring, all of MD (US)

(73) Assignee: University of Maryland Baltimore County, Baltimore, MD (US)

( * ) Notice: Subject to any disclaimer, the term of this patent is extended or adjusted under 35 U.S.C. 154(b) by 0 days.

(21) Appl. No.: 08/799,365

(22) Filed: Feb. 14, 1997

(51) Int. Cl.[7] .................................................. H04B 10/00
(52) U.S. Cl. .......................... 359/161; 319/134; 319/173; 319/188
(58) Field of Search ..................................... 359/160–161, 359/173, 188, 179, 195, 134, 124

(56) References Cited

U.S. PATENT DOCUMENTS

| | | | |
|---|---|---|---|
| 5,469,525 | 11/1995 | Luther-Davies et al. | 385/122 |
| 5,471,333 | 11/1995 | Taga et al. | 359/173 |
| 5,504,829 | 4/1996 | Evans et al. | 385/123 |
| 5,523,874 | 6/1996 | Epworth | 359/161 |
| 5,530,585 | 6/1996 | Reid et al. | 359/185 |
| 5,546,210 | 8/1996 | Chraplyvy et al. | 359/124 |
| 5,550,671 | 8/1996 | Simpson et al. | 359/337 |
| 5,557,441 | 9/1996 | Mollenauer | 359/173 |
| 5,579,428 | 11/1996 | Evans et al. | 385/124 |
| 5,642,215 * | 6/1997 | Suzuki et al. | 359/161 |
| 5,737,460 * | 4/1998 | Damen et al. | 359/161 |
| 5,767,998 * | 6/1998 | Hasegawa et al. | 359/161 |

OTHER PUBLICATIONS

Devaney et al; "Modelling WDM Soliton Transmission in Dispersion–Managed Systems", Conference Paper (IEE), Feb. 6, 1997, pp. 1–4.*
Hasegawa et al; "Reduction of Collision–Induced Time Jitters in Dispersion–Managed Soliton Transmission Systems", Optics Letters vol. 21, No. 1, Jan. 1, 1996, pp. 39–41.*
Matsuzono et al; "Transmission Characteristic Improvement of Two–Channel WDM Solitons by Controlling Initial Time Offset", Leo '96 Conference Proceeding Mollenaur et al; "WDM with Solitons in Ultra–Long Distance Transmission Using Lumped Amplifiers", Journal of Light Wave Technology, vol. 9, No. 3, Mar. 1991, pp. 362–367.*

* cited by examiner

Primary Examiner—Kinfe-Michael Negash
(74) Attorney, Agent, or Firm—Nath &Associates PLLC; Gary M. Nath; Harold L. Novick (57) ABSTRACT

Collisions between solitons in different frequency channels are one of the major sources of errors in transmission systems that utilize wavelength division multiplexing (WDM). Moreover, because standard transmission lines have lumped amplification, the four-wave mixing fields from soliton collisions grow uncontrollably, adding amplitude and timing jitter to the jitter due to ideal soliton collisions. These problems are addressed by using a specific dispersion map to implement dispersion management, by which it is possible to significantly reduce the collision-induced timing jitter and to improve system performance even in comparison with that provided by an ideal, exponentially decreasing dispersion fiber.

3 Claims, 5 Drawing Sheets

UNIFORM DISPERSION FIBER

FIG. 3B

DISPERSION DECREASING FIBER

FIG. 3C

DISPERSION MANAGED FIBER

FIG. 4A

UNIFORM DISPERSION FIBER

FIG. 4B

DISPERSION DECREASING FIBER

FIG. 4C

DISPERSION MANAGED FIBER

REDUCTION OF COLLISION INDUCED TIMING JITTER BY PERIODIC DISPERSION MANAGEMENT IN SOLITON WDM TRANSMISSION

The above invention was supported by NSF Grant ECS-9113382 and the government has certain rights to this invention.

FIELD OF THE INVENTION

The present invention generally relates to a method and apparatus for reducing errors in transmission systems caused by collisions between solitons in different frequency channels, and particularly in transmission systems that utilize wavelength division multiplexing (WDM).

BACKGROUND OF THE INVENTION

Collisions between solitons in different frequency channels are one of the major sources of errors in transmission systems that utilize wavelength division multiplexing (WDM). Moreover, because standard transmission lines have lumped amplification, the four-wave mixing fields from soliton collisions grow uncontrollably, adding amplitude and timing jitter to the jitter due to ideal soliton collisions. According to the present invention, these problems are addressed by using proper dispersion management, by which it is possible to significantly reduce the collision-induced timing jitter and to improve system performance even in comparison with that provided by an ideal, exponentially decreasing dispersion fiber.

Further, the present invention may significantly improve the performance of soliton communication systems with both time division multiplexing (TDM) and wavelength division multiplexing (WDM).

The present technology of WDM soliton systems uses either uniform dispersion fiber or dispersion decreasing fiber.

Various devices and methods are known pertaining to the transmission of solitons for use in telecommunications. Additionally, wave division multiplexing (WDM) is known in the field of telecommunications. Examples of such devices are discussed further hereunder.

U.S. Pat. No. 5,557,441 issued to Mollenauer discloses a soliton transmission system having plural sliding-frequency guiding filter groups to control timing jitter. The optical filters are arranged in groups whose average center frequency differs from the other groups along the length of the transmission line. The groups are arranged so as to have frequency increasing, frequency decreasing, and combinations of both, to reduce noise while permitting transmission of solitons.

U.S. Pat. No. 5,471,333 issued to Taga et al. discloses solitons, wherein wavelength dispersion is controlled by a fiber having first sections which have an average value of wavelength dispersion which is larger than the dispersion value meeting with the soliton condition, and second sections with an average value of the wavelength dispersion smaller than the dispersion value meeting with the soliton condition. The average value of the wavelength dispersion of the entire length of the optical fiber transmission line assumes a positive value.

U.S. Pat. No. 5,579,428 issued to Evans et al. was cited for teaching a single mode optical waveguide fiber using soliton signal pulses with a dispersion flattened waveguide. This reference fails to teach periodic dispersion management, nor does it address the problem of reduction of collision induced timing jitter, among other differences.

U.S. Pat. No. 5,523,874 issued to Epworth discloses an optical soliton pulse transmission system that replaces passive optical filters with active optical filters. A loop tunes the center frequency of the filter to provide a specific offset from the center frequency of the solitons.

U.S. Pat. No. 5,504,829 issued to Evans et al. discloses soliton transmission in fiber having a refractive index that monotonically decreases along the fiber.

U.S. Pat. No. 5,550,671 issued to Simpson et al. discloses Wavelength Division Multiplexed (WDM) technology. Similarly, U.S. Pat. No. 5,546,210 issued to Chraplyvy et al. discloses 4-wave mixing products with channel carriers and WDM technology.

U.S. Pat. No. 5,530,585 issued to Reid et al. discloses a dispersion shifted fiber for use in soliton optical transmission. U.S. Pat. No. 5,469,525 issued to Luther-Davies et al. discloses dark spatial soliton technology.

However, the foregoing references do not address the problem of reduction of collision induced timing jitter, and the use of periodic dispersion management to solve this problem. Further, the foregoing references do not address the problem of improving soliton WDM transmission using periodic dispersion management.

SUMMARY OF THE INVENTION

The present invention is directed to an optical fiber and an apparatus useful in improving soliton WDM transmission using periodic dispersion management. Further, the present invention addresses the problem of reduction of collision induced timing jitter, and employs periodic dispersion management to solve this problem.

As discussed hereinabove, collisions between solitons in different frequency channels are one of the major sources of errors in transmission systems that utilize wavelength division multiplexing (WDM). Moreover, because standard transmission lines have lumped amplification, the four-wave mixing fields from soliton collisions grow uncontrollably, adding amplitude and timing jitter to the jitter due to ideal soliton collisions. The present invention, by using proper dispersion management, significantly reduces the collision-induced timing jitter and improves system performance even in comparison with that provided by an ideal, exponentially decreasing dispersion fiber.

The present invention is based on the use of alternating-sign dispersion management. A dispersion map is provided to allow significant reduction of collision-induced timing jitter in WDM systems. Such dispersion-managed fiber systems are technologically easier to construct than is a system based on dispersion-decreasing fibers. The dispersion map according to the present invention does not use any special fibers, and can be constructed from standard and dispersion-shifted fibers.

Furthermore, a particular feature of the present invention is that the dispersion map enables solitons to propagate through almost 90% of the path in normal dispersion fiber which in general does not support soliton propagation.

An object of the present invention is accordingly to improve the quality of information transmission, while at the same time improving the information capacity of the transmission fibers used.

Another object of the present invention is to improve both single and multiple channel soliton transmission.

DETAILED DESCRIPTION OF THE INVENTION

Figure 1A:
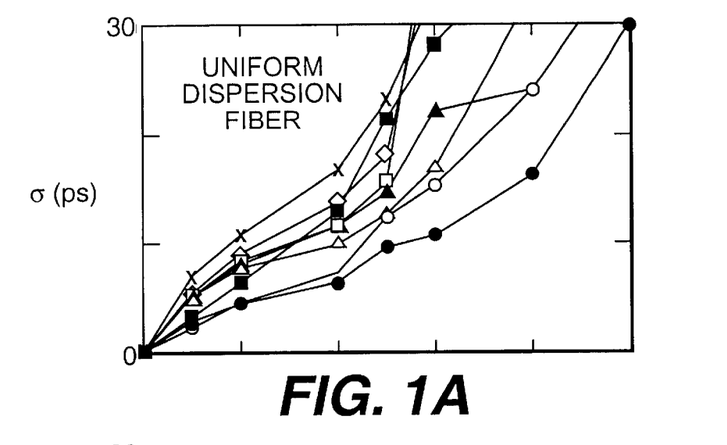
FIG. 1A illustrates the standard deviation of jitter in soliton arrival times versus propagation distance for an eight-channel unfiltered WDM system, for a uniform dispersion fiber.
Figure 1B:
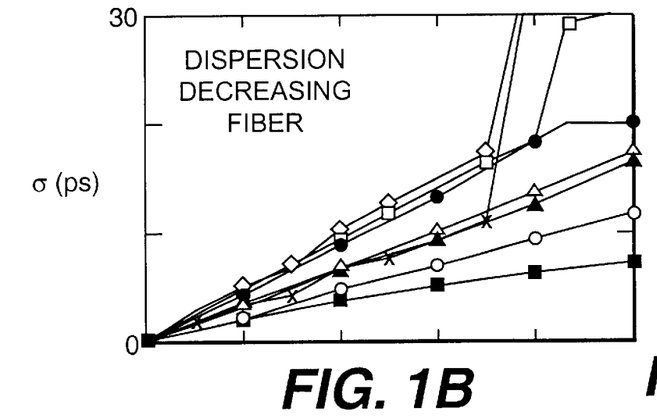
FIG. 1B illustrates the standard deviation of jitter in soliton arrival times versus propagation distance for an eight-channel unfiltered WDM system, for a dispersion-decreasing fiber.
Figure 1C:
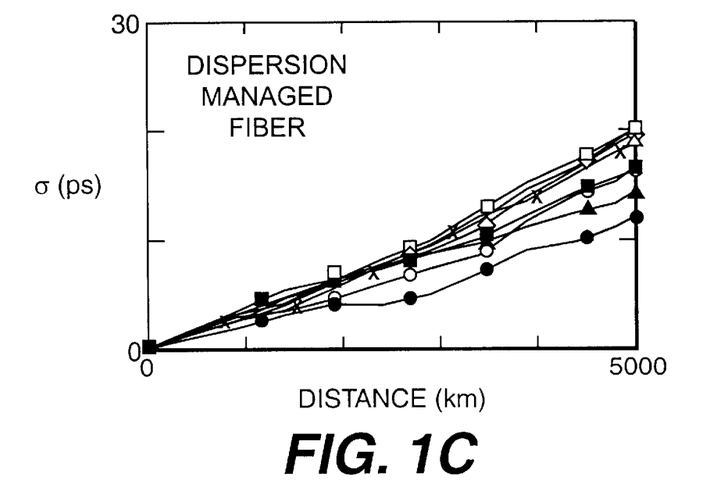
FIG. 1C illustrates the standard deviation of jitter in soliton arrival times versus propagation distance for an eight-channel unfiltered WDM system, for a dispersion-managed fiber according to the present invention.
Figure 1D:
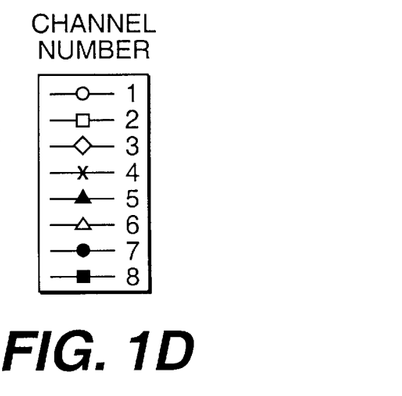
FIG. 1D is a chart of symbols used in FIGS. 1A–1C versus channel number.

FIGS. 1A–1C compare the standard deviation of jitter in soliton arrival times versus propagation distance for an eight-channel unfiltered WDM system, for various types of fiber, as follows. FIG. 1A illustrates the standard deviation of jitter in soliton arrival times versus propagation distance for an eight-channel unfiltered WDM system, for a uniform dispersion fiber. FIG. 1B illustrates the standard deviation of jitter in soliton arrival times versus propagation distance for an eight-channel unfiltered WDM system, for a dispersion-decreasing fiber. FIG. 1C illustrates the standard deviation of jitter in soliton arrival times versus propagation distance for an eight-channel unfiltered WDM system, for a dispersion-managed fiber according to the present invention. The symbols used in FIGS. 1A–1C correspond to channel numbers according to the chart in FIG. 1D. These figures are discussed further hereunder, with reference also to FIG. 2, in which FIG. 2 is a schematic diagram of a dispersion map according to the present invention.

Figure 2:
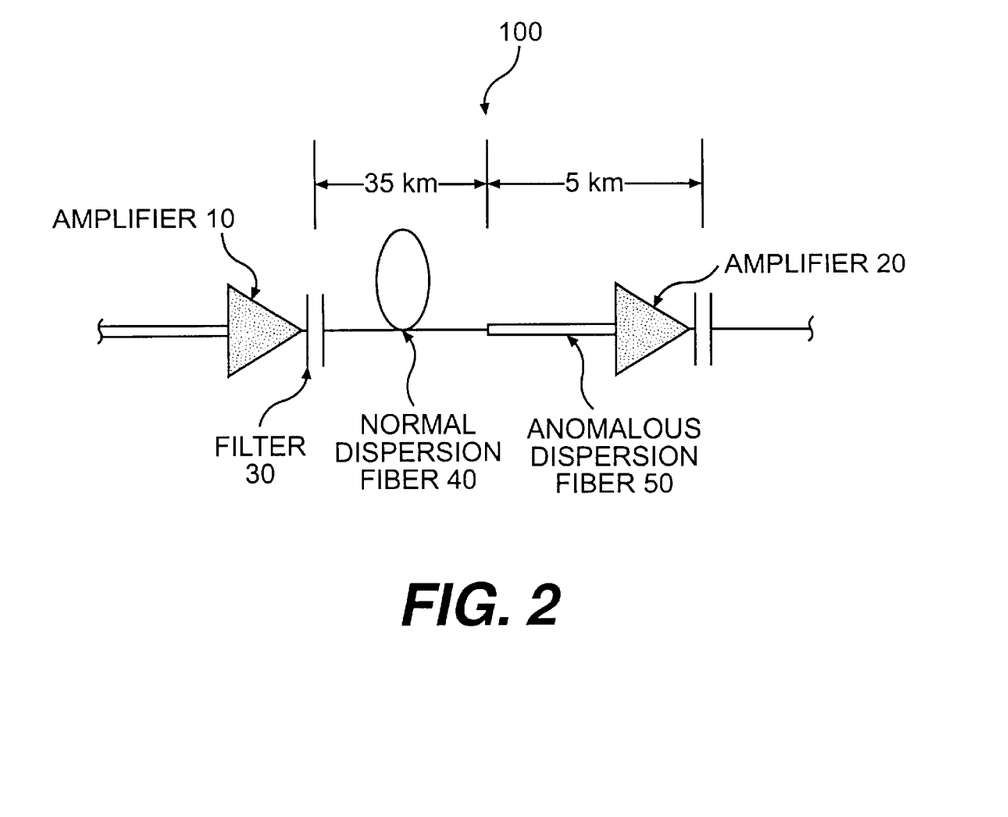
FIG. 2 is a schematic diagram of a dispersion map according to the present invention.

In FIG. 2, a dispersion map 100 is shown for a filter 30 and a normal dispersion fiber 40. A amplifier 10 is connected to the filter 30, and the length of the normal dispersion fiber 40 is approximately 35 km, and is followed by an approximately 5 km length of anomalous dispersion fiber 50. The anomalous dispersion fiber 50 is connected to an amplifier 20.

The present invention shown in FIG. 2 includes an improved optical fiber and optical fiber arrangement having improved periodic dispersion management, and an apparatus useful in improving soliton WDM transmission using periodic dispersion management. The present invention as shown reduces collision induced timing jitter by use of periodic dispersion management.

Collisions between solitons in different frequency channels are one of the major sources of errors in transmission systems that utilize wavelength division multiplexing (WDM). Moreover, because standard transmission lines have lumped amplification, the four-wave mixing fields from soliton collisions grow uncontrollably, adding amplitude and timing jitter to the jitter due to ideal soliton collisions. The present invention employs dispersion management to significantly reduce the collision-induced timing jitter and thereby improve system performance, even in comparison with that provided by an ideal, exponentially decreasing dispersion fiber.

The present invention is based on the use of alternating-sign dispersion management. A dispersion map as shown in FIG. 2 and described further hereunder, is provided to allow significant reduction of collision-induced timing jitter in WDM systems. The dispersion map according to the present invention does not use any special fibers, and can be constructed from standard and dispersion-shifted fibers.

Also, the dispersion map of the present invention enables solitons to propagate through almost 90% of the path in normal dispersion fiber which in general does not support soliton propagation. Further, both single and multiple channel soliton transmission can be used in the present invention.

The present invention uses dispersion management to reduce collision-induced timing jitter in soliton WDM transmission, and as a result the performance of dispersion managed fibers provides better performance that either dispersion-decreasing fibers and fibers with uniform dispersion. This is applicable both for filtered and unfiltered systems. This is discussed further hereunder.

A major source of errors in soliton wavelength-division-multiplexed (WDM) transmission is collision-induced timing jitter. Because standard transmission lines have lumped amplification, the four-wave mixing fields from soliton collisions grow uncontrollably even when the spacing between amplifiers is much smaller than the soliton collision length, adding amplitude and timing jitter to the jitter due to ideal soliton collisions. It has been proposed in the technical literature [P. V. Mamyshev and L. F. Mollenauer in Opt. Lett. 21, 397 (1996)] to use dispersion-decreasing fiber to reduce the four-wave mixing fields. However, by the present invention, dispersion management is shown to be a viable alternative to dispersion-decreasing fiber.

Remarkably, as discussed further hereunder, computational results show that solitons in dispersion-managed fibers can actually suffer less impairment than solitons in ideal dispersion-decreasing fibers with the same average dispersion when the channel spacing is less than about 10 pulse spectral widths.

Dispersion-managed fibers, i.e., fibers with dispersion maps that alternate in sign, have long been used in non-return-to zero transmission. There has been recent interest in also using dispersion management in soliton transmission to suppress Gordon-Haus timing jitter by decreasing the path-averaged value of dispersion [M. Suzuki, I. Morita, S. Yamamoto, N. Edagawa, H. Taga, and S. Akiba, Electron. Lett. 23, 2027 (1995)] and to suppress filtered soliton instabilities in WDM [S. Wabnitz, Opt. Lett. 21, 638 (1996)].

Computer simulations of up to eight WDM soliton channels were performed. Each such soliton channel was filled with pseudo-random 32 bit sequences of 20 ps solitons spaced in time by 5 FWHM. The path-averaged dispersion was D=0.5 ps/nm-km, and the amplifier spacing was 40 km. For the system with no in-line filtering, the amplifiers exactly compensated for the fiber loss. For the filtered transmission system, Fabry-Perot etalons were placed at the same location as amplifiers, and the filter transmission frequency was shifted with a rate close to the critical sliding rate [P. V. Mamyshev and L. F. Mollenauer, Opt. Lett. 21, 397 (1996)]. The amplifier gain for the filtered system was slightly increased to compensate for additional losses introduced into the system by the filters. In view of the calculating of the timing jitter from soliton collisions, the Gordon-Haus timing jitter was not included. To reduce the initial partial collision the soliton sequences in neighboring channels were shifted by half a time slot. It was found that a single channel in a fiber with uniform dispersion has transmission characteristics that are indistinguishable from a dispersion decreasing fiber with an ideal exponential taper. These calculations showed that when the WDM channels are spaced by 12 pulse spectral widths, the dispersion-decreasing fiber has the smallest jitter, but the performance of the dispersion-managed fiber is much better than the uniform dispersion fiber. This is shown in the following discussion with respect to FIGS. 1–5.

FIG. 1 shows the calculated standard deviation of the tuning jitter σ versus transmission distance for an eight-channel WDM system with channels spaced by 6 pulse spectral widths. The specific fibers under study included a fiber with uniform dispersion, a dispersion decreasing fiber with an ideal exponential taper, and a periodically dispersion managed fiber with the sign of the dispersion changing between the amplifiers.

A dispersion map according to the present invention is shown in FIG. 2. According to this dispersion map, a 35 km fiber is provided with normal dispersion $D_1=-2$ ps/nm-km which is followed by a 5 km fiber with anomalous dispersion $D_2=18$ ps/nm-km to provide the average value of anomalous dispersion D=0.5 PS nm-km. In this case, the total length of the dispersion map equals the amplifier spacing. According to the present invention as shown in FIG. 2, the solitons in dispersion-managed fibers suffer less impairment than solitons in ideal dispersion-decreasing fibers with the same average dispersion when the channel spacing is less than about 10 pulse spectral widths. Accordingly, the dispersion-managed fiber demonstrates the best performance.

For the unfiltered system, the timing jitter in the side channels for the dispersion-decreasing fiber is low, but drastic errors occur in the central channels. It is the central channels that are the most strongly affected by the collisions. By the present invention as shown in FIGS. 1 and 2, it is possible by managing the dispersion to actually have less timing jitter than is the case for ideal soliton collisions.

Figure 3A:
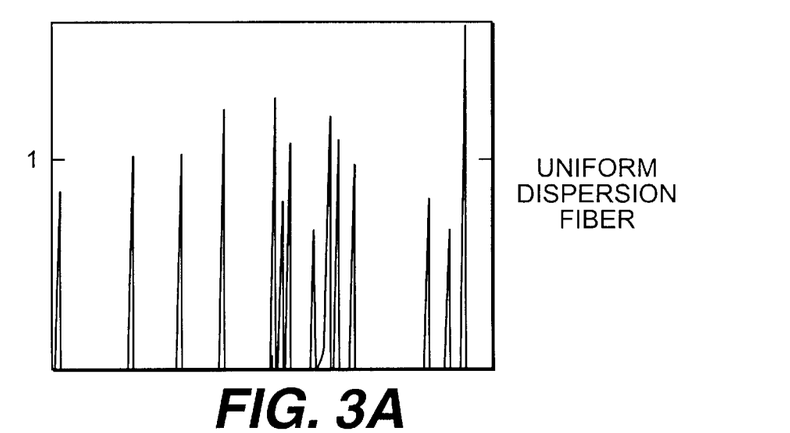
FIG. 3A illustrates the normalized pulse intensity of pulse trains in a demultiplexed 4th channel of an eight-channel unfiltered WDM system at 5,000 km, for a uniform dispersion fiber.
Figure 3B:
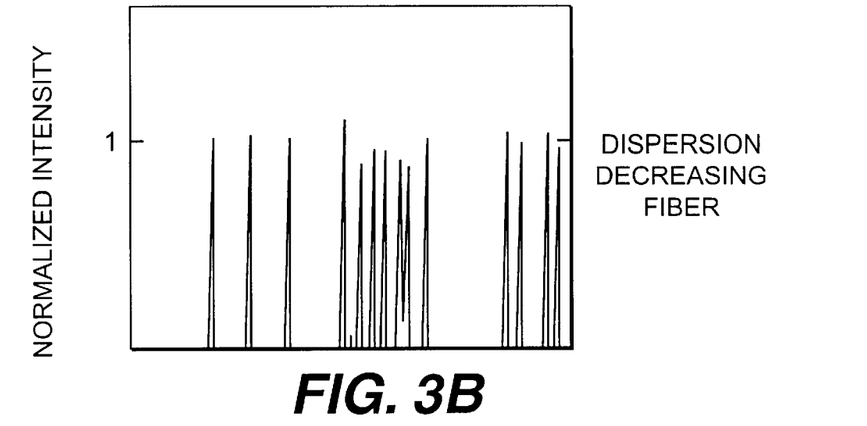
FIG. 3B illustrates the normalized pulse intensity of pulse trains in a demultiplexed 4th channel of an eight-channel unfiltered WDM system at 5,000 km, for a dispersion-decreasing fiber.
Figure 3C:
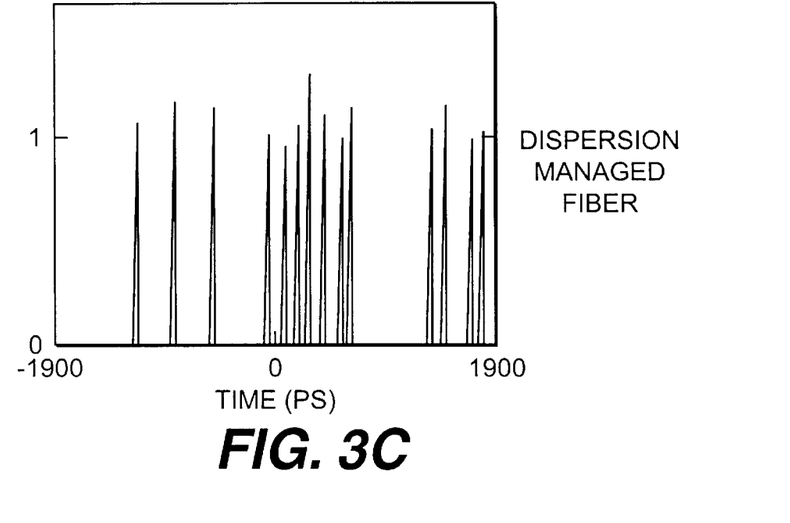
FIG. 3C illustrates the normalized pulse intensity of pulse trains in a demultiplexed 4th channel of an eight-channel unfiltered WDM system at 5,000 km, for a dispersion-managed fiber according to the present invention.

The pulse train of the central channel for the unfiltered system is shown in FIGS. 3A–3C. As shown in FIGS. 3A–3C, the normalized pulse intensity of pulse trains are shown in a demultiplexed 4th channel of an eight-channel unfiltered WDM system at 5,000 km. In these figures, the pulse intensity is normalized to the intensity of an average soliton in a transmission line with lumped amplification.

In FIG. 3A, the normalized intensity is shown with respect to time (ps) for a uniform dispersion fiber. In FIG. 3B, the normalized intensity is shown with respect to time (ps) for a dispersion decreasing fiber. In FIG. 3C, the normalized intensity is shown with respect to time (ps) for a dispersion managed fiber.

As seen in FIGS. 3A–3C, the amplitude jitter in the dispersion-managed fiber (FIG. 3C) is larger than in the dispersion-decreasing fiber (FIG. 3B).

FIG. 3A illustrates the normalized pulse intensity of pulse trains in a demultiplexed 4th channel of an eight-channel unfiltered WDM system at 5,000 km, for a uniform dispersion fiber. FIG. 3B illustrates the normalized pulse intensity of pulse trains in a demultiplexed 4th channel of an eight-channel unfiltered WDM system at 5,000 km, for a dispersion-decreasing fiber, and FIG. 3C illustrates the normalized pulse intensity of pulse trains in a demultiplexed 4th channel of an eight-channel unfiltered WDM system at 5,000 km, for a dispersion-managed fiber according to the present invention.

Figure 4A:
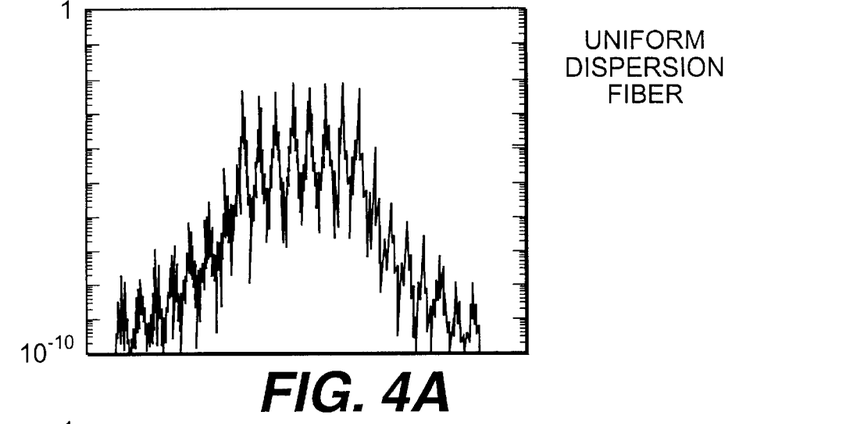
FIG. 4A illustrates the spectral intensity for the spectrum of the eight-channel unfiltered WDM system at 5,000 km, for a uniform dispersion fiber.
Figure 4B:
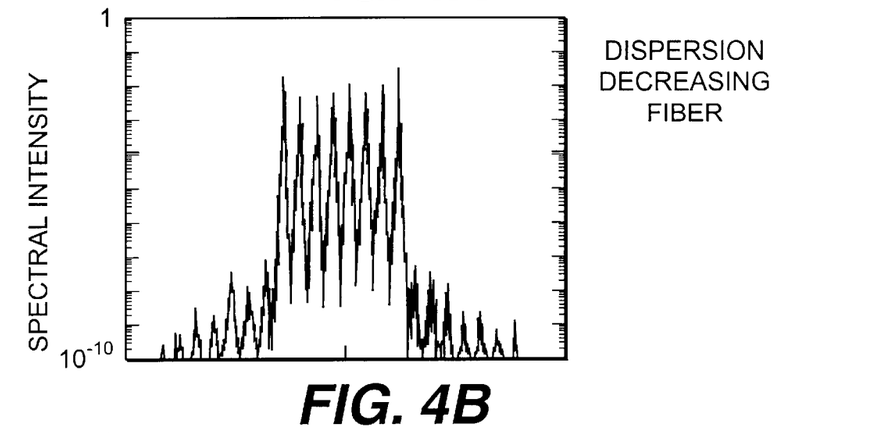
FIG. 4B illustrates the spectral intensity for the spectrum of the eight-channel unfiltered WDM system at 5,000 km, for a dispersion-decreasing fiber.
Figure 4C:
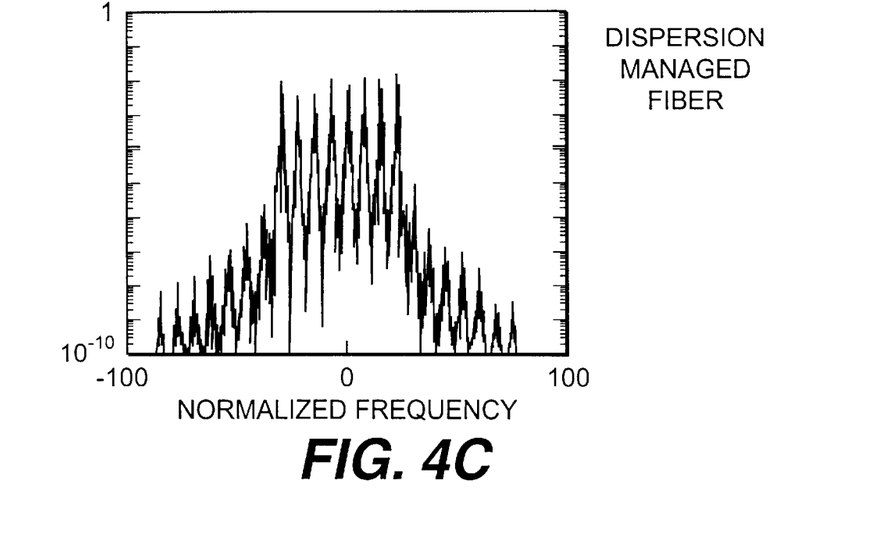
FIG. 4C illustrates the spectral intensity for the spectrum of the eight-channel unfiltered WDM system at 5,000 km, for a dispersion-managed fiber according to the present invention.

FIG. 4A illustrates the spectral intensity for the spectrum of the eight-channel unfiltered WDM system at 5,000 km, for a uniform dispersion fiber. FIG. 4B illustrates the spectral intensity for the spectrum of the eight-channel unfiltered WDM system at 5,000 km, for a dispersion-decreasing fiber. FIG. 4C illustrates the spectral intensity for the spectrum of the eight-channel unfiltered WDM system at 5,000 km, for a dispersion-managed fiber according to the present invention.

Further, as seen in FIGS. 4A–4C, the power of a four-wave mixing field in the dispersion-managed fiber (FIG. 4C) is larger than in the dispersion-decreasing fiber (FIG. 4B). Nevertheless, the dispersion-managed solitons are less impaired overall.

The introduction of in-line filters decreases the collision-induced timing jitter by a factor in a range of two to three.

Figure 5A:
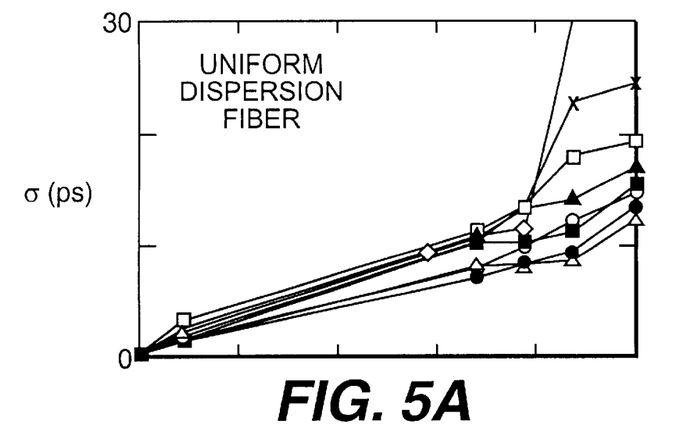
FIG. 5A illustrates the standard deviation of jitter in soliton arrival times versus propagation distance for an eight-channel WDM system with in-line filtering, for a uniform dispersion fiber.

FIG. 5A illustrates the standard deviation of jitter in soliton arrival times versus propagation distance for an eight-channel WDM system with in-line filtering, for a uniform dispersion fiber.

Figure 5B:
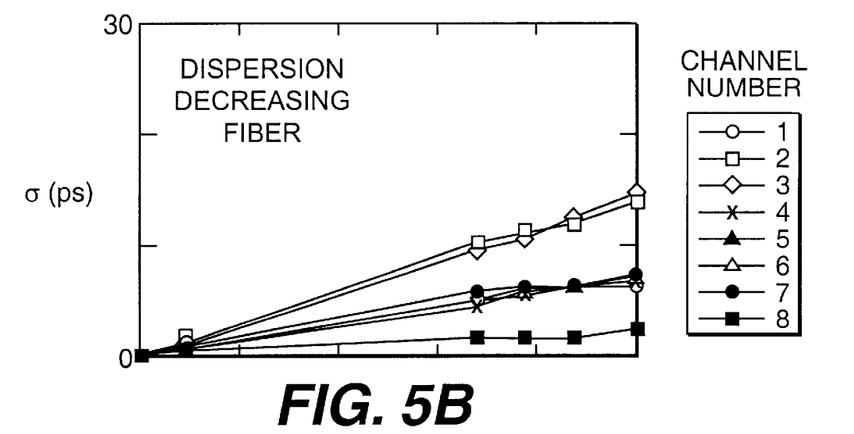
FIG. 5B illustrates the standard deviation of jitter in soliton arrival times versus propagation distance for an eight-channel WDM system with in-line filtering, for a dispersion-decreasing fiber.

FIG. 5B illustrates the standard deviation of jitter in soliton arrival times versus propagation distance for an eight-channel WDM system with in-line filtering, for a dispersion-decreasing fiber.

Figure 5C:
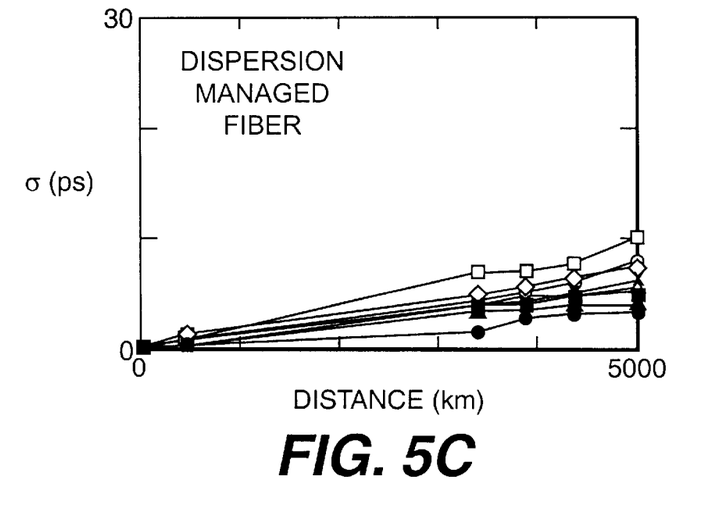
FIG. 5C illustrates the standard deviation of jitter in soliton arrival times versus propagation distance for an eight-channel WDM system with in-line filtering, for a dispersion-managed fiber according to the present invention.

FIG. 5C illustrates the standard deviation of jitter in soliton arrival times versus propagation distance for an eight-channel WDM system with in-line filtering, for a dispersion-managed fiber according to the present invention.

FIGS. 5A–5C show the calculated standard deviation of the timing jitter σ versus the transmission distance for an eight-channel WDM system with channels spaced by 6 pulse spectral widths for the case of the filtered system. As can be seen from these figures, the dispersion managed system (FIG. 5C) demonstrates the best performance.

The above result is particularly significant because it is currently far easier to construct a dispersion-managed system than it is to construct a system with an ideal exponential taper. Moreover, by the present invention, it should be possible to operate with lower average dispersion, thus lowering the amount of timing jitter.

The invention being thus described, it will be evident that the same may be varied in many ways. Such variations are not to be regarded as a departure from the spirit and scope of the invention and all such modification are intended to be included within the scope of the following claims.

What is claimed is:

1. An apparatus for reducing errors in transmission systems caused by collisions between pulses of the type that return to at least substantially zero in different frequency channels, comprising:

a dispersion management system having an input and an output;

said input receiving signals from more than two channels; and a transmission line for receiving said output;

wherein said transmission line comprises an amplifier, a filter connected to said amplifier, a normal dispersion fiber having a length of approximately 35 km, and an anomalous dispersion fiber having a length of approximately 5 km and connected to said normal dispersion fiber.

2. An apparatus for reducing errors in transmission systems caused by collisions between pulses of the type that return to at least substantially zero in different frequency channels for use in transmission systems that utilize wavelength division multiplexing, comprising:

a dispersion management system having an input and an output; and a first normal transmission line for receiving said output and a second anomalous transmission line connected to said first normal transmission line;

wherein said first normal transmission line comprises an amplifier, a filter connected to said amplifier, a normal dispersion fiber having a length of approximately 35 km, and said second anomalous transmission line comprises an anomalous dispersion fiber having a length of approximately 5 km and connected to said normal dispersion fiber.

3. An apparatus for reducing errors in transmission systems caused by collisions between solitons in different frequency channels for use in transmission systems that utilize wavelength division multiplexing, comprising:

a dispersion management system having an input and an output;

said input receiving signals from more than two channels; and a transmission line for receiving said output, said transmission line comprising a first transmission line connected to a second transmission line to significantly reduce collision-induced timing jitter and to improve system performance in comparison with that provided by an ideal, exponentially decreasing dispersion fiber;

therein said first transmission line comprises an amplifier, a filter connected to said amplifier, a normal dispersion fiber having a length of approximately 35 km, and said second transmission line comprises an anomalous dispersion fiber having a length of approximately 5 km and connected to said normal dispersion fiber.

* * * * *

UNITED STATES PATENT AND TRADEMARK OFFICE
CERTIFICATE OF CORRECTION

PATENT NO.   : 6,243,181 B1
DATED        : June 5, 2001
INVENTOR(S)  : Ekaterina A. Golovchenko, et al.

It is certified that error appears in the above-identified patent and that said Letters Patent is hereby corrected as shown below:

<u>Claim 3,</u>
Line 15, "therein" should be -- wherein --

Signed and Sealed this

Thirteenth Day of November, 2001

Attest:

*Nicholas P. Godici*

NICHOLAS P. GODICI
*Attesting Officer*   *Acting Director of the United States Patent and Trademark Office*